T. L. CROSSLEY.
CIRCULAR CORE AND DISK CUTTING TOOL.
APPLICATION FILED MAY 5, 1910.
983,810.
Patented Feb. 7, 1911.
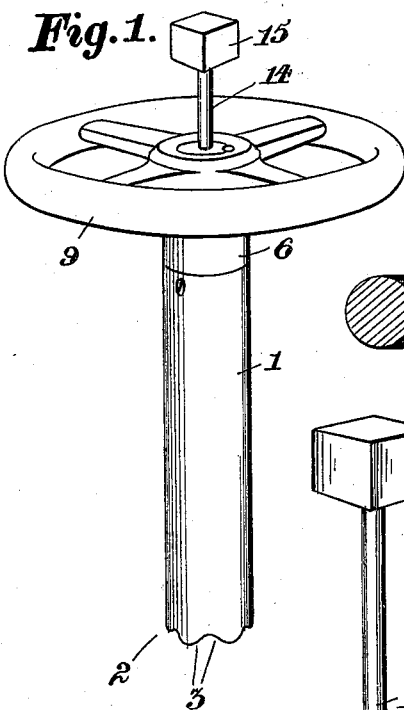
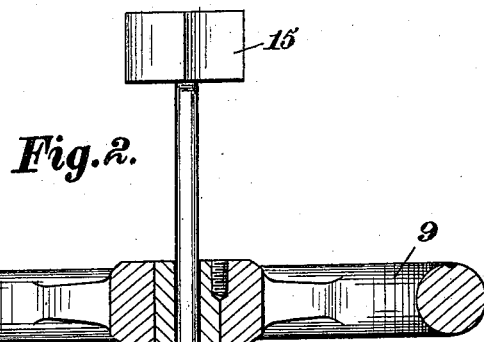
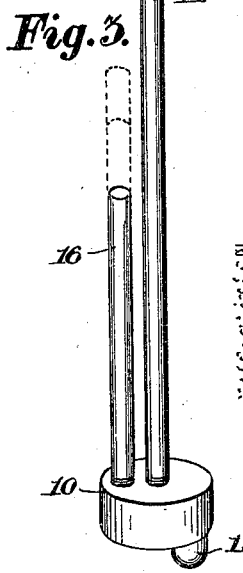
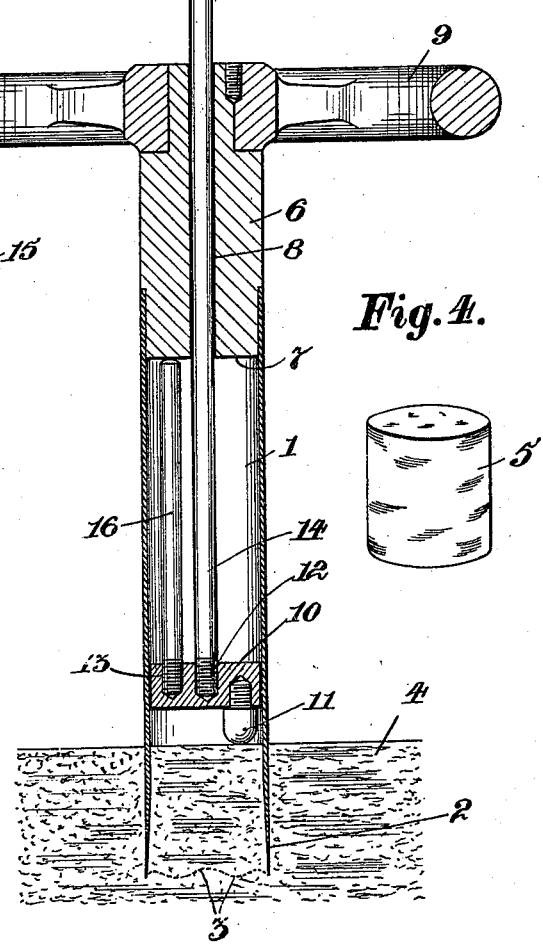
Witnesses.
H. Davis
P. Shee
Inventor.
T. L. Crossley
By
Atty

UNITED STATES PATENT OFFICE.

THOMAS LINSEY CROSSLEY, OF WESTMOUNT, QUEBEC, CANADA.

CIRCULAR CORE AND DISK CUTTING TOOL.

983,810.　　　　Specification of Letters Patent.　　Patented Feb. 7, 1911.

Application filed May 5, 1910. Serial No. 559,526.

*To all whom it may concern:*

Be it known that I, THOMAS LINSEY CROSSLEY, a subject of the King of Great Britain, residing at 239 Metcalfe avenue, in the city of Westmount, in the district of Montreal, Province of Quebec, Dominion of Canada, have invented certain new and useful Improvements in Circular Core and Disk Cutting Tools; and I do hereby declare that the following is a full, clear, and exact description of the same.

The invention relates to improvements in circular core and disk cutting tools, as described in the present specification and illustrated in the accompanying drawings that form part of the same.

The invention consists essentially in the novel construction and arrangement of parts, whereby the circular core or disk is separated from the body of the substance by a cylindrical form of cutter from which it is expelled by a peculiar form of plunger.

The objects of the invention are to cut cores from masses of pulp for testing purposes, also to provide a tool which will make a clean cut free from outward expansion from said tool, and, generally, to facilitate the cutting of circular disks and cores from wood, cork, pulp or other substances.

In the drawings, Figure 1 is a perspective view of the tool showing the plunger in its upward position. Fig. 2 is an enlarged vertical sectional view of the tool, showing said tool embedded in a mass of material. Fig. 3 is an enlarged perspective detail of the plunger. Fig. 4 is an enlarged perspective detail of a core cut by said tool.

Like numerals of reference indicate corresponding parts in each figure.

Referring to the drawings, 1 is a cutter of cylindrical form having the cutting edge 2 at the end thereof, said cutting edge being formed in scallops 3, said scallops being beveled from the inner wall of the said cylinder cutter, consequently the outer wall of said cutter is in perfect alinement to said cutting edge, thereby preventing any outward expansion into the mass of substance 4 being cut, all said expansion being in the core 5.

6 is the body of the tool to which the cutter 1 is rigidly secured, said body 6 forming the abutment 7 at the inner end of the cylinder of said cutter 1, and having central orifice 8 therethrough. 9 is a hand wheel rigidly secured to the body 6 for the purpose of turning said cutter in the substance to be cut, though it must be understood that this is only one form of handle that may be used, and further that in place of a handle, the body, or the cutter itself may be fitted into a chuck and operated in a machine in place of being manually operated.

10 is a plunger traveling in the cylinder of the cutter 1 and having at one side of the center and adjacent to the edge thereof on its outer surface the boss 11, said boss being in the form of a knob on the plunger or a separable piece screwed thereinto as may be found most desirable.

12 is a central threaded hole into the plunger from the inner side thereof.

13 is a threaded hole into the plunger from the inner side thereof to one side of the center.

14 is a rod having a threaded end corresponding to the central threaded hole 12 and screwed thereinto, said rod extending through the orifice 8 and having at its upper end thereof the squared head 15. The rod 14 permits the plunger 10 to slide slightly beyond the cutting edge 2, consequently when a core is within the cylindrical cutter after the operation of cutting, on pushing said plunger the said core may be expelled completely from said cutter and in doing this the boss 11 performs the service of sliding the core in the cylinder and thus starting said core on its outward course, otherwise the core will jam in the cylinder.

16 is a rod having a threaded end corresponding to the threaded hole 13 and screwed thereinto, said rod being adapted to measure the depth of the cut by said tool as the said rod limits the inward travel of the plunger 10. It is desirable of course to have several rods similar to the rod 16 but of different lengths as shown in Fig. 3 by dotted lines above said rod.

In the operation of this invention the tool is grasped by the hand wheel 9, the depth of the cut having first been determined and the proper length rod 16 put in place. The cutting edge 2 is then applied to the surface of the substance and pressure brought to bear on the hand wheel the cutter being given a rotatory motion either reciprocatory or otherwise. The core cut by the said cutter enters the cylinder and the tool is withdrawn. The rod 14 is then pushed inwardly from its outward position and the boss 11 first engages the core upsetting it and thus starting the outward movement of said core and as the plunger 10 travels beyond the cutting edge the core is completely removed.

In the simple form of this tool, especially when it is used in pulp-mills and such places for testing purposes, the cutting edge 2 may readily be sharpened by hand, for by holding in one hand a piece of emery paper and resting the head 15 on a bench and then turning the cylindrical cutter it is only a matter of a few seconds to secure a keen edge, as the said emery paper may be applied both inside and outside.

There are, of course, many uses for this invention, though probably the most general use is that of securing cores for testing purposes at pulp mills yet in many other substances it will cut cores or disks for all manner of purposes.

The shape of the plunger rod head and some other details of construction are not essential to the invention though important features, the really salient parts, being the general form of the cutter and the arrangement and construction of the plunger.

What I claim as my invention is:

1. In a circular core and disk cutting tool, a cylindrical cutter having a scalloped cutting edge at one end thereof, a plunger having a boss on its outer surface to one side of the center thereof, and a plunger rod extending outwardly from said plunger through the other end of said cutter.

2. In a circular core and disk cutting tool, a cylindrical cutter having a scalloped cutting edge at one end thereof, a body portion supporting said cutter at the other end and having a central orifice therethrough, a plunger having a boss at one side of the center and traveling in said cutter and a plunger rod secured to said cutter and extending therefrom through said orifice.

3. In a circular core and disk cutting tool a cylindrical cutter having a suitable cutting edge at one end thereof, a plunger traveling in said cutter and having a boss at one side of the center from the outer surface thereof, and a plunger rod extending from said plunger through the other end of said cutter.

4. In a circular core and disk cutting tool, a cylindrical cutter having a scalloped cutting edge, a body portion rigidly secured to the other end of said cutter and having a central orifice therethrough, a plunger having a boss at one side of the center from the outer surface, a plunger rod secured to said plunger and extending through said orifice and having a suitable head and a measuring rod extending from said plunger to one side of the center thereof in the direction of said body portion.

5. In a circular core and disk cutting tool, a cylindrical cutter having a scalloped cutting edge at one end thereof, a solid body portion rigid with said cutter at the other end thereof forming an abutment at the inner end of the cylinder of said cutter and having a central orifice therethrough, a plunger having a knob or projection to one side of the center from its outer surface, a central threaded hole into the inner side thereof and a threaded hole to one side of the center into the inner side, a plunger rod having a threaded end corresponding to said central threaded hole and screwed thereinto and extending through said central orifice, a measuring rod having a threaded end corresponding to the other threaded hole in said plunger and screwed thereinto and extending therefrom and adapted to meet said abutment in the inner position of said plunger and a squared head on said plunger rod.

Signed at the city of Montreal, Quebec, Canada, this 29th day of April, 1910.

THOMAS LINSEY CROSSLEY.

Witnesses:
HARRY DAVIS,
P. SHEE.